UNITED STATES PATENT OFFICE.

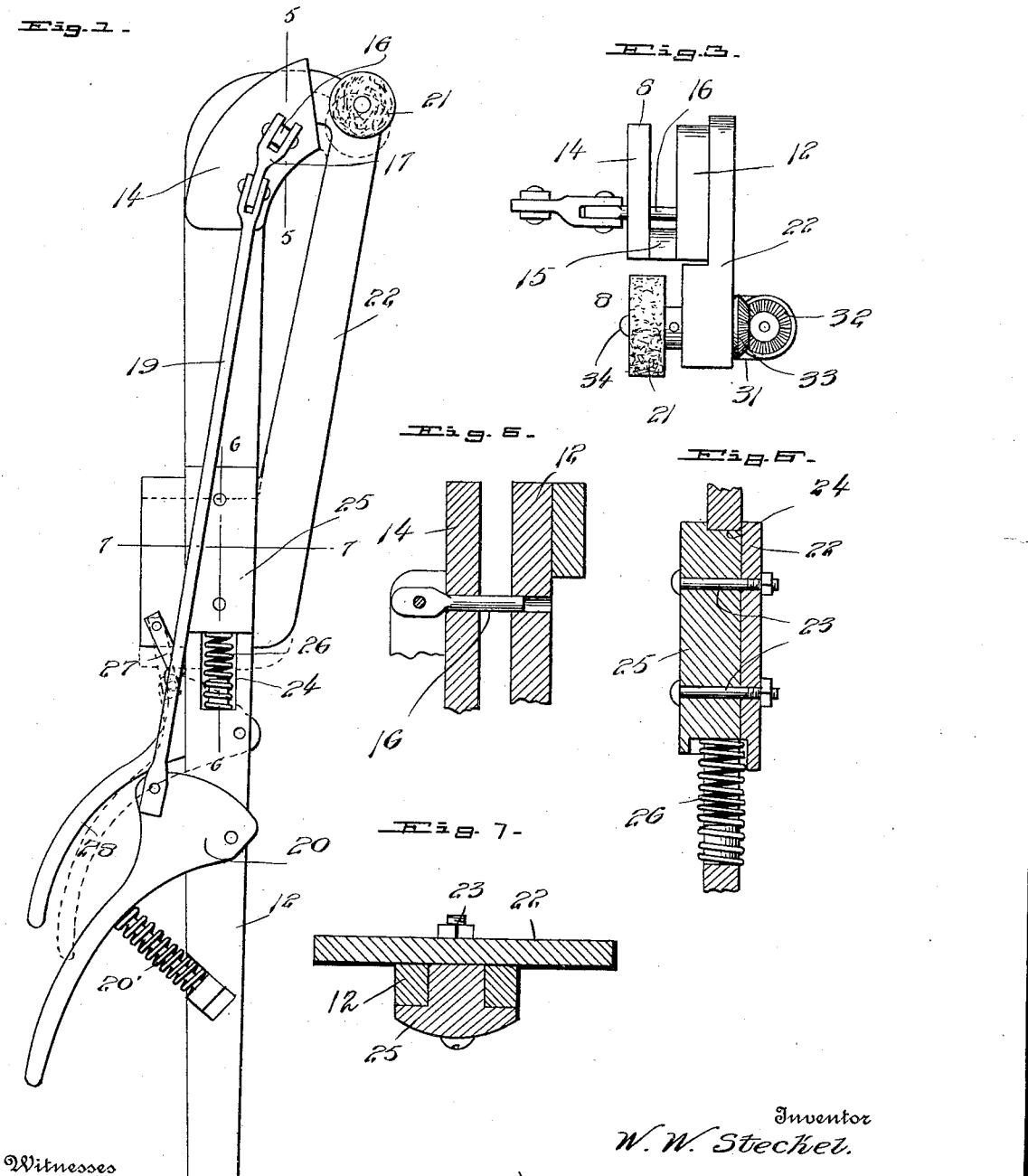

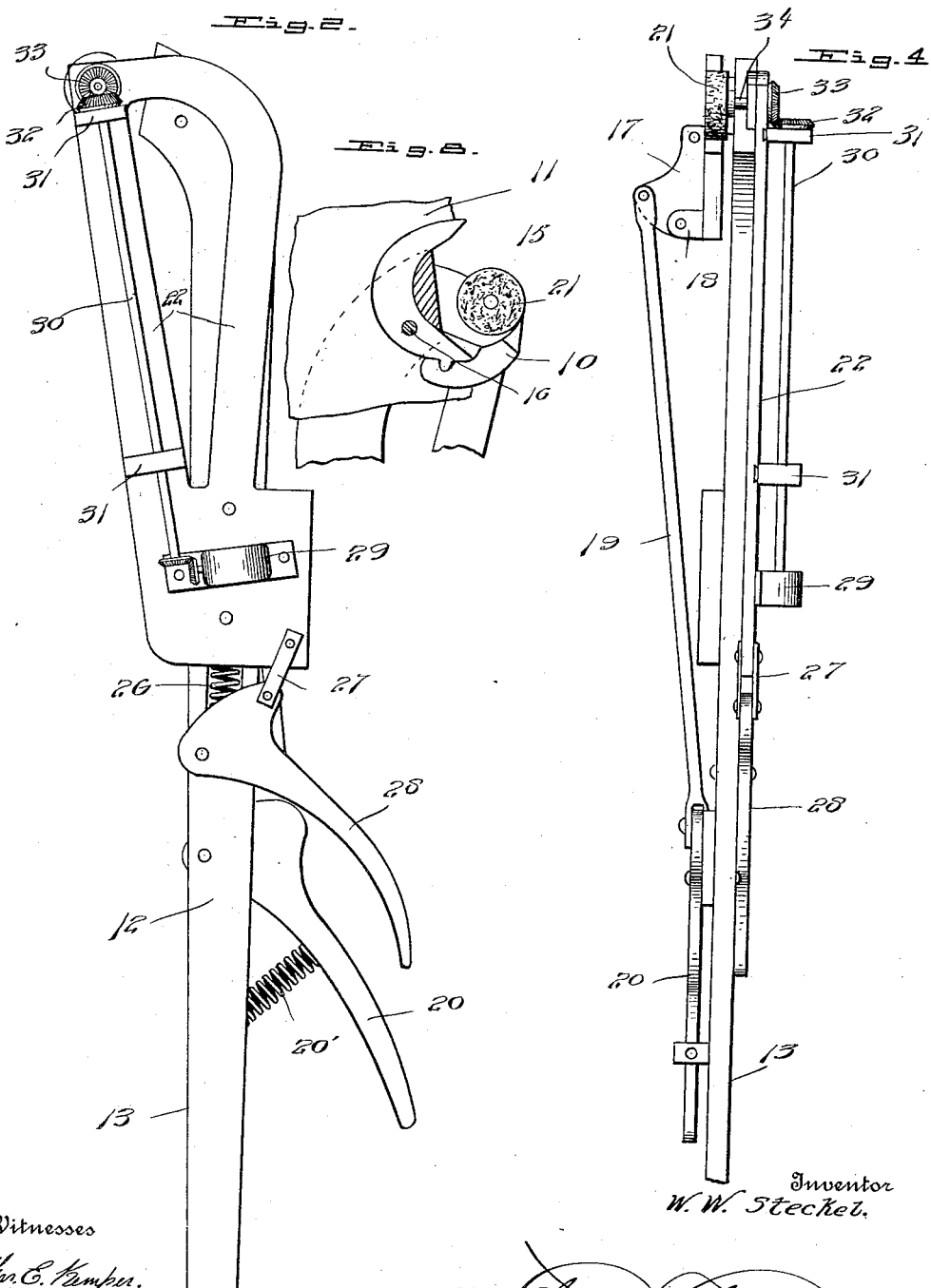

WILLIAM W. STECKEL, OF EASTSIDE, OREGON.

PORTABLE SAW-SHARPENER.

1,111,191.  Specification of Letters Patent.  Patented Sept. 22, 1914.

Application filed August 19, 1913. Serial No. 785,527.

*To all whom it may concern:*

Be it known that I, WILLIAM W. STECKEL, a citizen of the United States, residing at Eastside, in the county of Coos, State of Oregon, have invented certain new and useful Improvements in Portable Saw-Sharpeners; and I do hereby declare the following to be a full, clear, and exact description of the invention, such as will enable others skilled in the art to which it appertains to make and use the same.

This invention relates to tools for sharpening saw teeth of the removable type, and has for an object to provide an extremely simple portable tool which will include an electric motor operated emery wheel and means for holding the saw tooth against the emery wheel.

A further object is to provide means for causing the emery wheel to exert pressure upon the saw tooth, and for releasing the emery wheel when the sharpening operation is completed.

A still further object is to provide a tool of this character that may be inexpensively constructed and may be formed of a few simple parts that will not easily get out of order.

With the above objects in view the invention consists of certain novel details of construction and combination of parts hereinafter fully described and claimed, it being understood that various modifications may be made in the minor details of construction within the scope of the appended claims.

In the accompanying drawings illustrating this invention:—Figure 1 is a side elevation showing one side of the tool. Fig. 2 is a side elevation showing the reverse side of the tool. Fig. 3 is an end elevation. Fig. 4 is a plan view. Fig. 5 is a fragmentary vertical sectional view on the line 5—5 Fig. 1 showing the saw tooth securing pin. Fig. 6 is a fragmentary vertical sectional view on the line 6—6 Fig. 1. Fig. 7 is a fragmentary cross sectional view on the line 7—7 Fig. 1. Fig. 8 is a fragmentary cross sectional view on the line 8—8 Fig. 1.

Referring now to the drawings in which like characters of reference designate similar parts, 10 designates the saw tooth to be sharpened, the same being best shown in Fig. 8, and being of the ordinary removable type employed in saws, such as shown at 11. For sharpening this type of saw tooth, I provide a tool including a shank 12 the lower end of which forms a handle 13 and the upper end of which is slightly curved forwardly and is provided on the outer side with a retaining plate 14 that is connected by a web 15 to the curved end, the saw tooth being inserted between the plate and said curved end until the heel portion of the tooth hooks over the top edge of the web and the point of the tooth is disposed below and in advance of the web as shown.

For locking the tooth in place a locking pin 16 is slidably engaged through the web and curved end and is connected at the outer end to an angular lever 17 that is pivoted at the elbow as at 18 upon the plate 14, the bell crank lever being connected by a link 19 to an angular operating lever 20 that is pivoted on the shank 12, there being a helical spring 20' carried by the handle 13 and bearing upon this operating lever to normally hold the pin in operative position, pressure upon the operating lever against the tension of this spring withdrawing the pin.

An emery wheel 21 is carried upon a slide 22 that is fitted upon the shank 12 by means of bolts 23 passed through a longitudinal slot 24 in the shank and through a plate 25 on the opposite side of the shank from the slide, there being a helical spring 26 disposed in the bottom of this slot and exerting an upward pressure upon the slide whereby to normally hold the emery wheel raised. The slide is connected by a link 27 to an operating lever 28 that is pivoted on the shank, compression of this lever toward the shank serving to draw down the slide whereby the emery wheel is forced against the edge of the tooth to sharpen the tooth.

For actuating the emery wheel an electric motor 29 is mounted upon the slide 22 and has a gear connection with a shaft 30 carried in bearings 31 disposed on the slide, this shaft having a bevel pinion 32 meshing with a bevel pinion 33 carried on the emery wheel shaft 34.

In operation the saw tooth is inserted in proper position as above described and the pin 16 engaged therethrough to lock the tooth in place. The electric motor is now started and the slide operating lever 28 depressed to bring the emery wheel into engagement with the edge of the tooth for sharpening the tooth. Upon the tooth being sharpened said lever is released whereby the spring 26 of the slide forces the emery wheel out of engagement with the tooth. The tooth may now be released by depressing the pin operating lever 20 to withdraw the pin.

From the above description it will be seen that I have provided an extremely simple, inexpensive and effective tool for sharpening saw teeth, such tool being formed of a few parts that will not easily get out of order.

What is claimed, is:—

1. A tool for sharpening saw teeth comprising a shank having an opening receiving the saw tooth, a spring pressed pin engaged through said opening and adapted to pass through an opening in the saw tooth to hold the latter in place, a slide on said shank, an emery wheel carried by said slide, means on said slide for actuating said emery wheel, a spring normally holding said slide in position to dispose said emery wheel out of engagement with the saw tooth, and an operating lever on said shank connected to said slide and serving to move said slide to force said emery wheel against said tooth.

2. A tool for sharpening saw teeth comprising a shank, a retaining plate on one side of said shank connected at the forward edge to said shank by a web, the saw tooth being positioned between said shank and said plate with the heel curving over and bearing upon the top edge of said web and the point disposed below and in advance of said web, a spring pressed pin carried by said shank engaged through an opening in said tooth to anchor the latter, a slide on said shank, a rotary emery wheel on said slide, and means for moving said slide to dispose said emery wheel in and out of engagement with said tooth.

3. A tool for sharpening saw teeth comprising a shank having an opening receiving the saw tooth, a spring pressed pin engaged through said opening and adapted to pass through an opening in the saw tooth to hold the latter in place, a slide on said shank, an electric motor on said slide, an emery wheel on said slide, an operative connection between said motor and said emery wheel, a spring on said shank normally holding said slide in position to dispose said emery wheel out of engagement with the saw tooth, and an operating lever on said shank connected to said slide and serving to move said slide to force said emery wheel against said tooth.

In testimony whereof, I affix my signature, in the presence of two witnesses.

WILLIAM W. STECKEL.

Witnesses:
A. T. LAGERSTROM,
J. S. HANSON.

Copies of this patent may be obtained for five cents each, by addressing the " Commissioner of Patents, Washington, D. C."